United States Patent
Byrne et al.

(10) Patent No.: US 9,424,525 B1
(45) Date of Patent: Aug. 23, 2016

(54) FORECASTING FUTURE STATES OF A MULTI-ACTIVE CLOUD SYSTEM

(71) Applicant: International Business Machines Corporation, Armonk, NY (US)

(72) Inventors: Alan Byrne, Dublin (IE); Jason Lloyd, Dublin (IE); Andrew T. Penrose, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/944,255

(22) Filed: Nov. 18, 2015

(51) Int. Cl.
*G06N 7/00* (2006.01)
*G06N 5/02* (2006.01)

(52) U.S. Cl.
CPC . *G06N 7/005* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 8,271,974 B2 | 9/2012 | Mazhar et al. | |
| 8,341,462 B2 | 12/2012 | Broda et al. | |
| 8,639,791 B2 | 1/2014 | Carter et al. | |
| 8,856,319 B1 | 10/2014 | Huang et al. | |
| 2007/0083796 A1 | 4/2007 | Patrizio et al. | |
| 2009/0307763 A1* | 12/2009 | Rawlins | G06F 11/2294 726/5 |
| 2012/0151061 A1* | 6/2012 | Bartfai-Walcott | G06F 9/4856 709/226 |
| 2013/0111257 A1 | 5/2013 | Broda et al. | |
| 2014/0149494 A1* | 5/2014 | Markley | H04L 67/34 709/203 |
| 2014/0298082 A1 | 10/2014 | Rikitake et al. | |
| 2015/0172204 A1 | 6/2015 | Anderson et al. | |

FOREIGN PATENT DOCUMENTS

| | | |
|---|---|---|
| CN | 103051469 A | 4/2013 |
| WO | 2013094048 A1 | 6/2013 |

OTHER PUBLICATIONS

King et al., "Migrating Autonomic Self-Testing to the Cloud", Third International Conference on Software Testing, Verification, and Workshops, 2010 IEEE, pp. 438-443.
Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Alan Chen
(74) *Attorney, Agent, or Firm* — Erik J. Johnson; Edward Choi

(57) ABSTRACT

An embodiment of the invention may include a method, computer program product and computer system for forecasting future states of a multi-active cloud. The method, computer program product and computer system may include a computing device that determines the operating state of the passive server. The operating state of the passive server is one or more of a deploying state and a smoke testing state. The computing device may determine the probability of the operating state successfully completing. The computing device may delay the second asynchronous workflow until the operating state successfully completes based on the probability of the operating state successfully completing exceeding a predetermined value.

17 Claims, 6 Drawing Sheets

FORECASTING FUTURE STATES OF A MULTI-ACTIVE CLOUD SYSTEM

BACKGROUND

The present invention relates to states of a multi-active cloud system, and more particularly to forecasting future states of a multi-active cloud system.

Cloud systems can be very complex distributed systems. In larger cloud systems, there may be many types of nodes, containing code from various development teams, deployed by a different operations teams with many test teams responsible for testing different parts of the system. Cloud emphasizes concepts such as self-service, the Application Programming Interface (API) economy and automation. The API economy is the commercial exchange of business functions, capabilities, or competencies as services using web application programming interfaces (APIs). Bearing this in mind, an idealized system includes a fully automated deployment and testing process.

Consider an active-active or active-passive Software as a Service (SaaS) deployment architecture, whereby new code is deployed in parallel to existing code and end users are eventually "flipped" from the old active side to a new active side. Requests received from an end user are routed through load balancing so that the end user is not aware of which of the two sides is providing the service. This fully automated solution introduces challenges. It is desirable that test automation execute without manual intervention but there may be little purpose in starting a test run just before a code "flip" occurs. In an active-passive deployment, the flip may cause an outage causing the test to fail and in an active-active deployment, it may be more desirable to wait until after a flip so that the test run executes against the most up to date code level.

It would be desirable to track the various states of cloud environments and publish this information, for programmatically knowing the current state of an environment, such as whether it is available. It would also be desirable to publish this information to provide indications of future states, for example, if a code flip will likely occur in 20 minutes, it may be best to delay a test run until the flip is complete.

BRIEF SUMMARY

An embodiment of the invention may include a method, computer program product and computer system for forecasting future states of a multi-active cloud. The method, computer program product and computer system may include a computing device that determines the operating state of the passive server. The operating state of the passive server is one or more of a deploying state and a smoke testing state. The computing device may determine the probability of the operating state successfully completing. The computing device may delay the second asynchronous workflow until the operating state successfully completes based on the probability of the operating state successfully completing exceeding a predetermined value.

BRIEF DESCRIPTION OF THE DRAWINGS

Preferred embodiments of the present invention will now be described in more detail, by way of example only, with reference to the accompanying drawings, in which.

DETAILED DESCRIPTION

Figure 1:
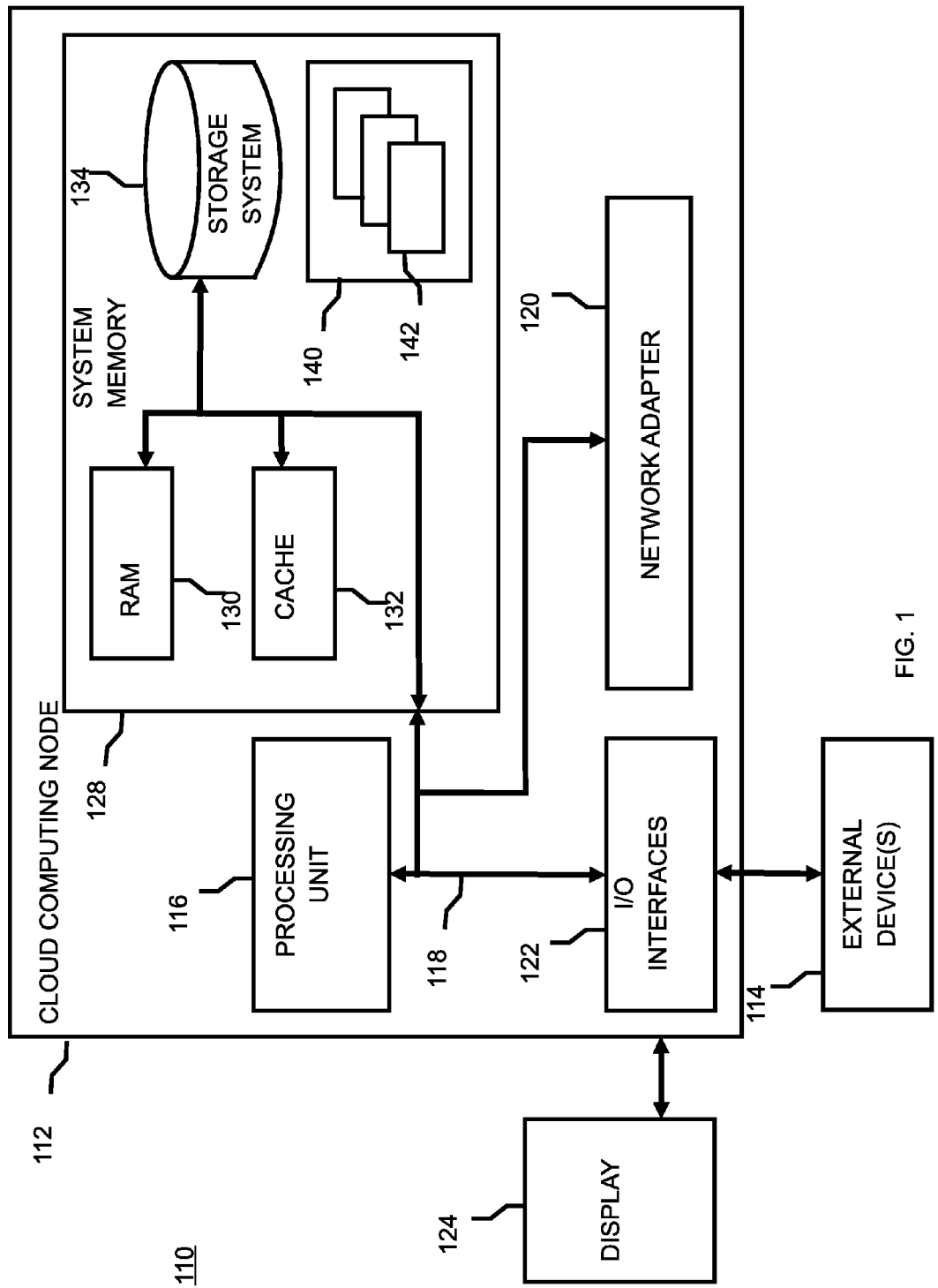
FIG. 1 depicts a cloud computing node according to an embodiment of the present invention.

Embodiments of the present invention will now be described in detail with reference to the accompanying Figures.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110, there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a consumer to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples include, but are not limited to: microcode, device drivers, redundant processing units, external disk drive arrays, RAID systems, tape drives, and data archival storage systems, etc.

Figure 2:
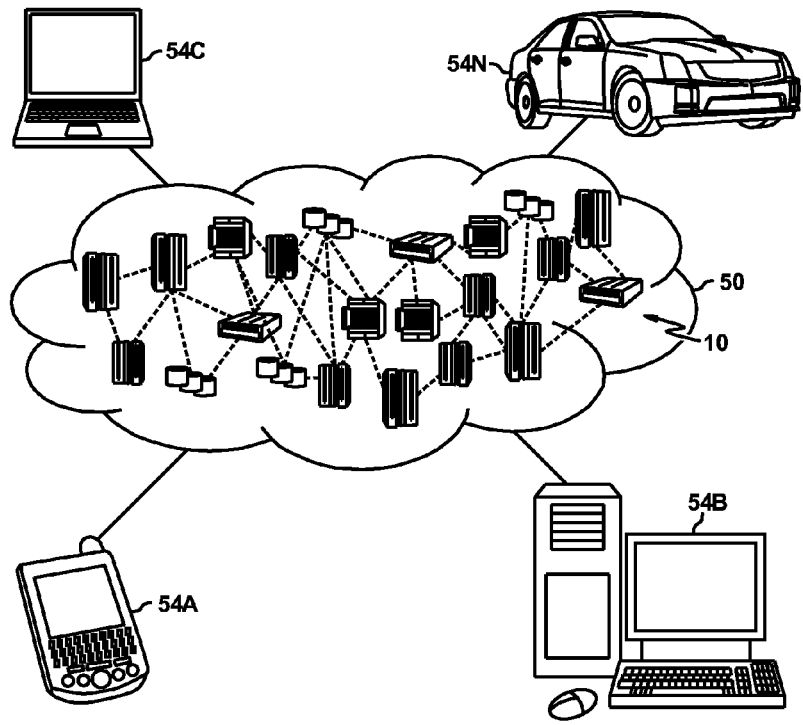
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
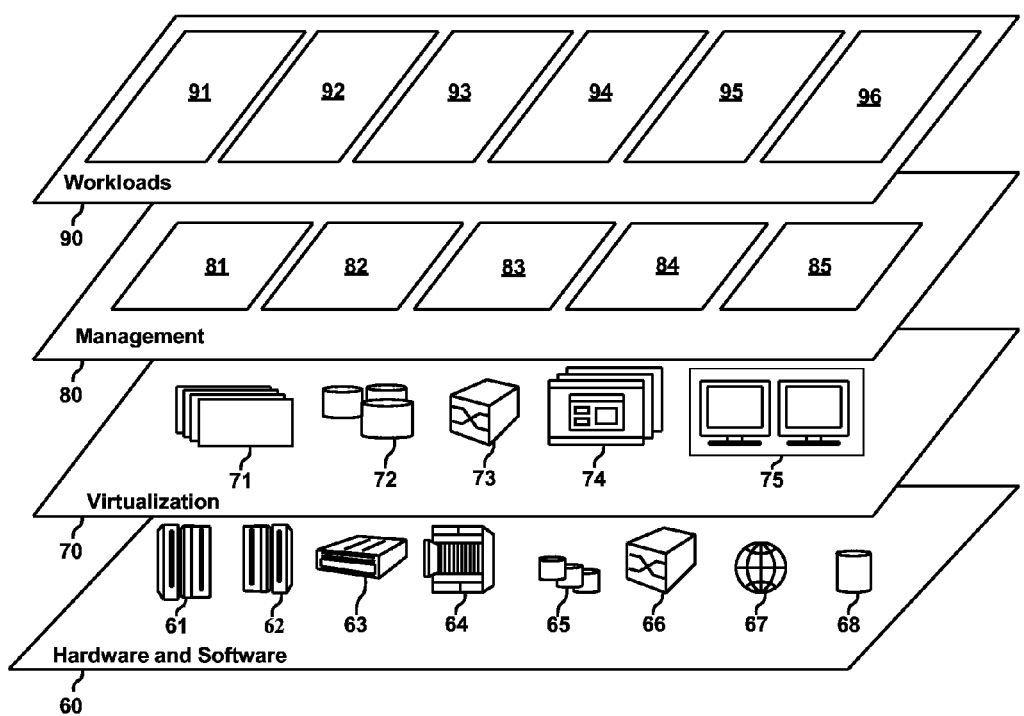
FIG. 3 depicts abstraction model layers according to an embodiment of the present invention.

Referring now to FIG. 3, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and cost generation 96. As mentioned above, all of the foregoing examples described with respect to FIG. 3 are illustrative only, and the invention is not limited to these examples.

Embodiments of the present invention provide a system capable of aggregating and providing the state of a cloud SaaS deployment system with sufficient detail to enable forecasting or prediction of future states. The specific embodiment described below is a system state that identifies a current "passive side" software upgrade with a potential imminent future "switch" between the "active" side and the "passive" side of an environment. For example, in an active/passive deployment architecture, new code may be deployed to an passive side of an environment which is then switched out with the current active side. Users are re-directed from between sides and the code upgrade is exposed to end users. This forecasting of a future state allows, for example, test automation to decide the best course of action in terms of "kick off testing now" or "wait until code upgrade before testing".

Figure 4:
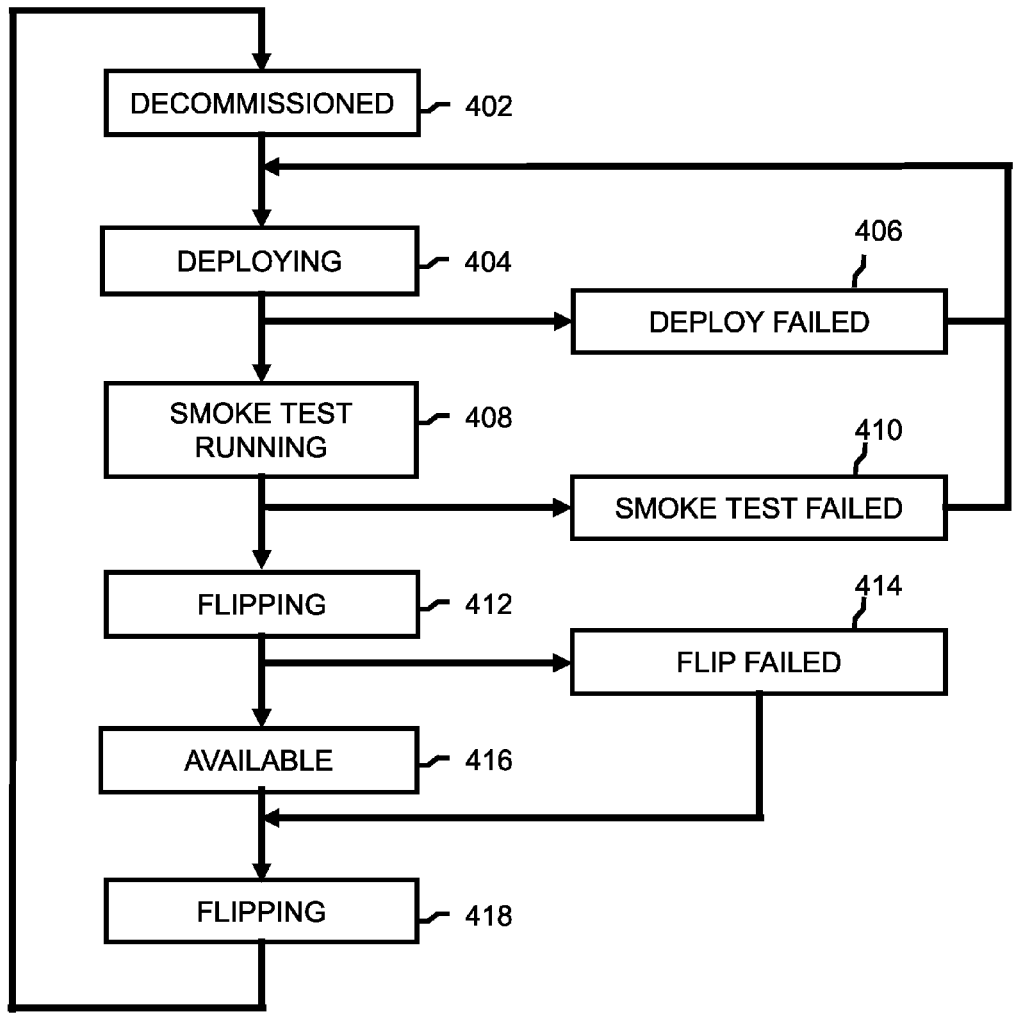
FIG. 4 is a state diagram of the states of a system in a multi-active cloud system.

FIG. 4 is a state diagram of the states of a system in a multi-active cloud system. The states are those which a distributed system in an active/passive deployment architecture may pass through. In this exemplary embodiment, there is always a first "active" side of the environment in the "Available" state 416. A second "passive" side moves through the other states in FIG. 4, trying to get into a healthy state to eventually "flip" and replace the old first "active" side.

The second "passive" side may be in a Decommissioned state 402 and prepared for a deployment of new code to that side. From the Decommissioned state 402, deployment starts for the second "passive" side and the state of that side moves to a Deploying state 404. When the second "passive" side is in the Deploying state 404, any test automation should not try to start any testing on the second "passive" side as it is being upgraded with new code. Any testing that is started when in the Deploying state 404 is liable to fail because there will be an outage when end users are "flipped" from the first previously active side to the second previously passive side when it flips to be active.

If the deployment to the second passive side is unsuccessful, then the state changes to a Deploy Failed state 406 and when deployment is retried, the state returns to a Deploying state 404. If the deployment is successful, then the state changes to a Smoke Test Running state 408. A Smoke Test is a short set of tests run on each new build of code to verify that the build is testable before the build is released into the hands of the test team. The set of tests exercise the mainstream functionality of the application software. If the Smoke Test is unsuccessful, then the state changes to a Smoke Test Failed state 410 and then back to a Deploying state 404. If the Smoke Test is successful, then the state changes to a Flipping state 412. When the second "passive" side is in the Smoke Test Running state 408, any test automation should not try to start any testing on the second "passive" side as it is being upgraded with new code. Any testing that is started when in the Smoke Test Running state 408 is liable to fail because there will be an outage when end users are "flipped" from the first previously active side to the second previously passive side when it flips to be active.

When the state changes to a Flipping state 412, any test automation knows that it should not try to start any testing on the second "passive" side as it is in the process of being flipped. Any testing that is started when in the Flipping state 412 will fail because there will be an outage when end users are "flipped" from the first previously active side to the second previously passive side when it flips to be active. The test automation also knows that the active side code level will be upgraded shortly.

If the flipping between the second passive and the first active side fails, then the second passive side changes to a Flip Failed state 414 and then to a Flipping state 418 as it is flipped back to being a passive side. From a Flipping state 418, it returns to a Decommissioned state 402 and the code deployment may be retried.

At the Deploying state 404, the Smoke Test Running state 408 and the Flipping state 412, as mentioned above, any test automation should not try to start any testing on the second "passive" side as it is being upgraded with new code. Any testing that is started is liable to fail because there will be an outage when end users are "flipped" from the first previously active side to the second previously passive side when it flips to be active. However, the probability of any testing failing differs between each of these states and is also dependent on the estimated probability of successful completion of each of the transitions from these states. This estimated probability may be based on a past history of deployments on the side at which deployment is taking place. This will be described below in more detail with reference to FIG. 7.

Figure 5:
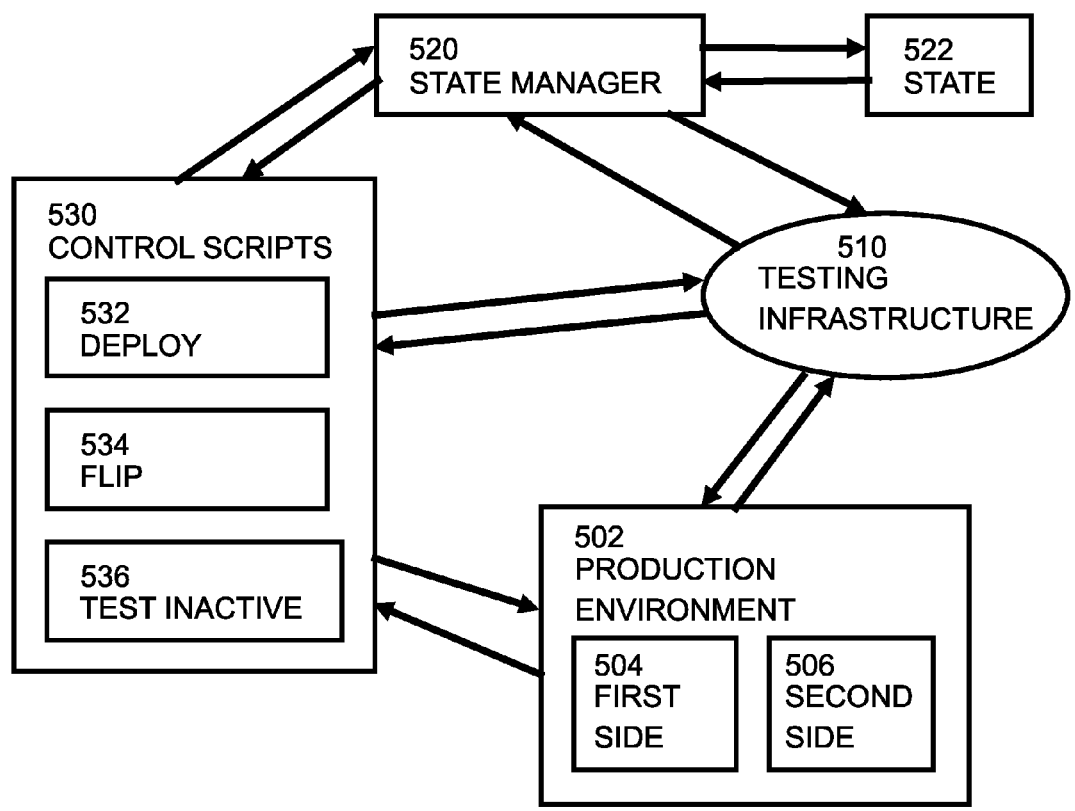
FIG. 5 is a block diagram of an embodiment of a system of forecasting future states of the multi-active cloud system of FIG. 4.

Referring to FIG. 5, which is a block diagram of an embodiment of a system of forecasting future states of the multi-active cloud system. Production environment 502 is the environment that is providing a production service to end users. The production service is typically a service provided by the production environment 502 through the cloud. Within production environment are shown two sides first side 504, and second side 506. These sides 504, 506 may be configured in a normal operating configuration to either both be active at the same time or they may be configured for one to be active and one to be passive. If they are configured in a normal operating configuration to both be active, then when a deployment of new code is planned, one of the sides is changed from an active state to a passive state, the new code is deployed to that side and then that side is made active again. If they are configured in a normal operating configuration for one to be active and one to be passive, then when a deployment of new code is planned, the new code is deployed to the side that is configured to be passive. The two sides are then flipped, so that the side that was passive becomes active and the side that was passive becomes active.

Testing infrastructure 510 comprises the tests that are to be run against the production environment 502 during the Smoke Test described above. State Manager 520 manages the environment state 522. The states were explained above with reference to FIG. 4. Each piece of state data typically comprises:

{
"date":"{current_timestamp}",
"cloud":"{env_name}",
"server":"{server_name}",
"side":"{side_name}",
"state":"{current_state}"
}

Each piece of state data may further comprise additional items or may omit any of the items specified, which are given as examples only. Control scripts 530 are used to control the process flow based on the states and to set the states accordingly. Deploy 532 control script moves a side 504, 506 from a Decommissioned state 402 into a Deploying state 404 if the deployment is successful and potentially into a Deploy Failed state 406 if the deployment is not successful. If the deployment is successful, then the Deploy 532 control script passes control to the Test Inactive 536 control script. Flip 534 control script moves a side through a Flipping state 412 state to an Available 416 state if the flip is successful or to a Flip Failed state 414 if the flip fails. Test Inactive 536 control script is local to the state Smoke Test Running state 408. Depending upon preferences set, it may also be possible for the Test Inactive 536 control script to be executed unconditionally in order to see how severe a deployment failure is.

Figure 6:
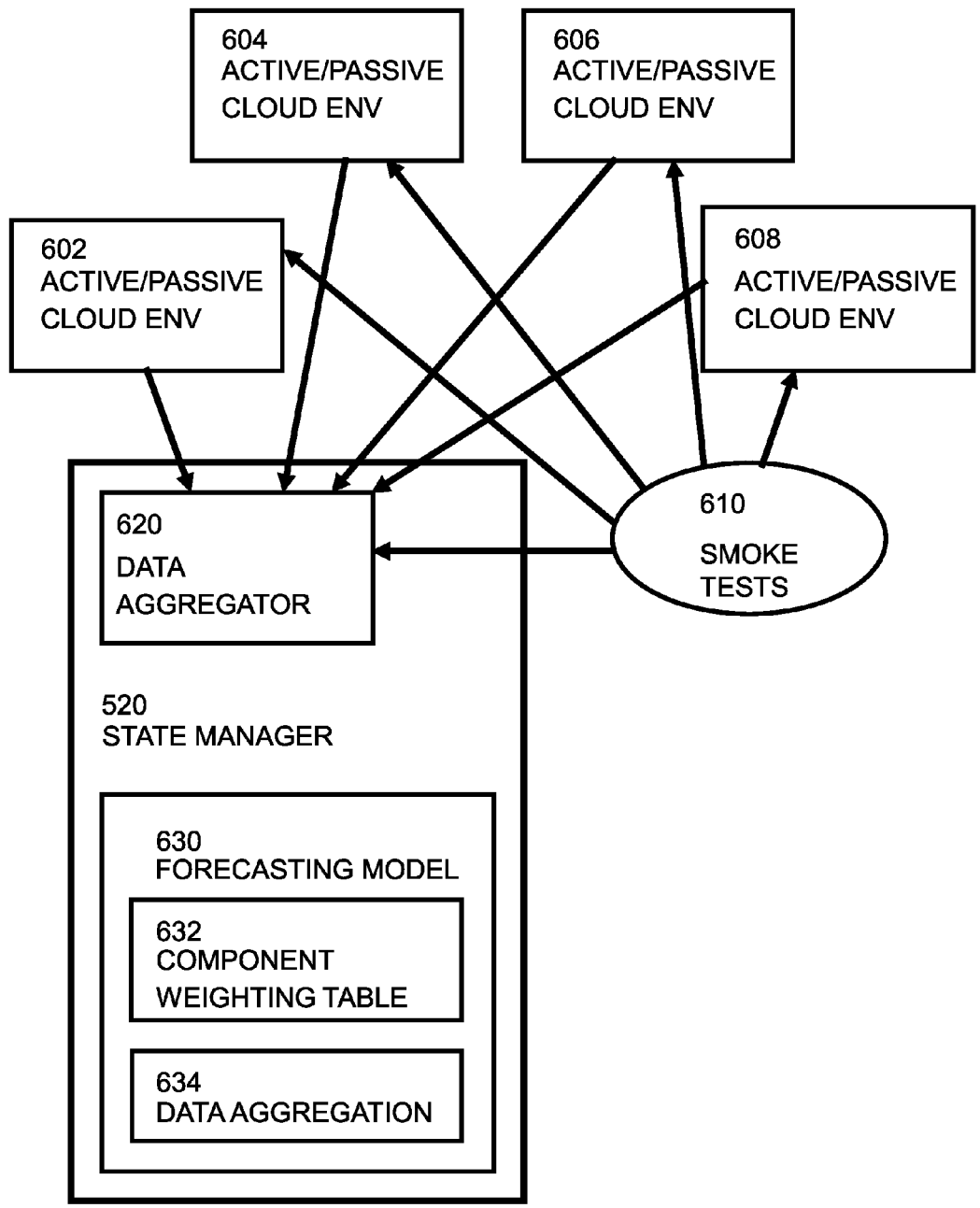
FIG. 6 is a data flow diagram showing data flows in an active/passive cloud system.

Referring to FIG. 6, which is a data flow diagram showing data flows in an active/passive cloud system. Active/Passive cloud environment systems 602-608 correspond to production environment 502 of FIG. 5. Each of the Active/Passive cloud environment systems 602-608 have an active side corresponding to first side 504 of FIG. 5 and a passive side corresponding to second side 506 of FIG. 5. Smoke tests 610 are carried out on each of the cloud environments 602-608. The results of those smoke tests 610 are sent to a data aggregator 620, which aggregates the received smoke test result data. The data aggregator 620 is part of the state manager 520 of FIG. 5. The state manager 520 further comprises a forecasting model 630, which itself further comprises a component weighting table 632 and data aggregation 634. Forecasting model 630 is a prediction model that predicts the probability of a flip. Component weighting table 632 is used to weight the importance of any component in determining when deciding if a flip should occur. The importance of one server when compared with another or of one smoke test when compared with another may be different. A failure of a database may be more significant to deciding whether a flip should occur than a failure of a single application node from a cluster of application nodes in terms of determining that a flip should not occur. Similarly, a failure of one smoke test may be more significant in deciding whether a flip should occur than a failure of another smoke test. Data aggregation 634 receives data from many sources over time which is used by the forecasting model to make predictions of whether a flip should occur.

Figure 7:
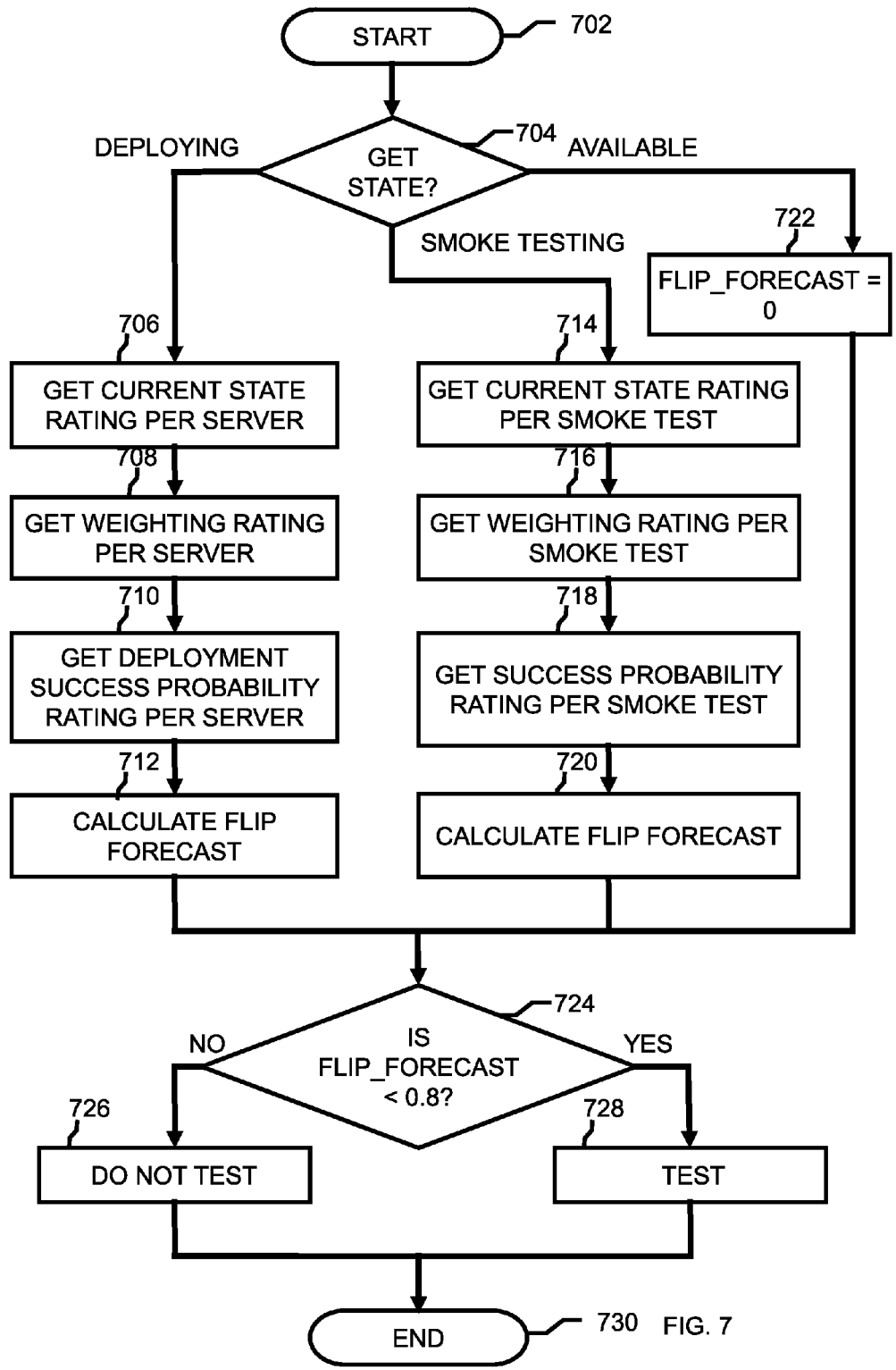
FIG. 7 is a flow diagram of an embodiment of a method of forecasting future states of the multi-active cloud system of FIG. 4.

Referring to FIG. 7, which is a flow diagram of an embodiment of a method of forecasting future states of the multi-active cloud system of FIG. 4. An embodiment of a method according to the present invention starts at step 702. At step 704, a check is made as to the current state of the side of the multi-active cloud system. If the state is "Deploying" 404, then processing proceeds to step 706. If the state is "Smoke Test Running" 408, then processing proceeds to step 714. If the state is "Available" 416, then processing proceeds to step 722. Depending on the state of the side, different calculations are completed at steps 706 to 712, steps 714 to 720 or step 722. If the state is "Flipping" 412, then the Flip_Forecast is equal to 1 as a flip is definitely occurring and all testing should be paused. If the state is Decommissioned state 402, then the Flip_Forecast is equal to 0 as a flip cannot occur. These states are not shown in FIG. 7, as there is no calculation of a Flip_Forecast to be done, as it is possible to be certain that either there is a flip occurring or there will not be a flip.

If the state at step 704 was "Deploying" 404 and processing has proceeded to step 706, then the current state rating per server is obtained. This is the current state of the server, that is "Deploying", "Deployment failed" or "Deployment successful". At step 708, the weighting rating per server is obtained. The weighting rating per server is the importance of the server, that is, if the server failed, would it still be possible to flip. At step 710, the deployment success probability rating per server is obtained. The deployment success rating is based on a server's current state and the importance of the server in the overall system or side. These are used to generate a figure to be used by the final flip forecast logic. The figure represents the probability of successful deployment of a side, but takes into account the importance of the server. The calculation of this figure may look at historical data for the side as well. For example, if this side is one side among many in a cluster, then have its siblings deployed correctly in the past. At step 712, a flip forecast is calculated. Processing continues to step 724.

If the state at step 704 was "Smoke test running" 408 and processing has proceeded to step 714, then the current state rating per smoke test is obtained. This is the current state of the smoke test, that is, is it in progress, has it completed and, if so, was it successful. At step 716, the weighting rating per smoke test is obtained. The weighting rating per server is the importance of the server, that is, if the server failed, would it still be possible to flip. At step 718, the success probability rating per smoke test is obtained. The success probability rating is based on a test's current state and the importance of the server in the overall system or side. These are used to generate a figure to be used by the final flip forecast logic. The figure represents the probability of this test returning successfully but takes into account the importance of the test. The calculation of this figure may look at historical data for the side as well. For example, whether the outcome of this smoke test is correlated to other smoke tests. At step 720, a flip forecast is calculated. Processing continues to step 724.

If the state at step 704 was "Available" 416 and processing proceeded to step 722, then the flip_forecast value is set to zero as there is zero chance of the active side being flipped to become a passive side. At this step, it is assumed that the other side is decommissioned. Optionally, flips may be suppressed if automation is running on the active side. Processing continues to step 724.

When step 724 is executed, either a flip forecast was calculated at step 712 or step 720, or the flip forecast was set to zero at step 722. At step 724, a check is made as to whether the flip forecast is less than a pre-determined value. In an embodiment, the pre-determined value is 0.8. In this embodiment, this means that a check is made as to whether there is less than an 0.8 (or 80%) chance of a flip taking place. If the flip forecast is not less than 0.8, then a flip is quite likely to occur and processing proceeds to step 726. Values other than 0.8 may be used, the exact value to be used then being determined by experience. An exemplary calculation of a flip forecast is described in the next paragraph. At step 726 a "DO NOT TEST" indication is provided meaning that it is advised not to test the current side because a flip is likely to happen, causing an outage and the test to fail to complete. The embodiment of the method of the present invention ends at step 730. If the flip forecast is less than 0.8, then a flip is less likely to occur and processing proceeds to step 728. At step 728 a "TEST" indication is provided meaning that it is advised that it is acceptable to test the current side because a flip is not likely to happen, an outage is unlikely and the test will likely not fail to complete. The embodiment of the method of the present invention ends at step 730.

An exemplary calculation of a flip forecast will now be described. The number of servers and all of the values used are exemplary only and are provided solely in order to provide a clearer explanation of how a flip forecast is calculated.

In the exemplary calculation, it is assumed that there are three servers, server A, server B and server C on one side. The following values and the step in FIG. 7 where they are referred to may be, for example:

Step 706—State rating values
Started=0.8
Success=1.0
Failed=0.3
Step 708—Weight rating values per server
Server A, weighting of 0.9
Server B, weighting of 0.7 (server B depends on server A)
Server C, weighting of 0.6 (server C depends on server C)
Step 710—Deployment success probability per server
Server A, 99% probability (has passed last three deployments)
Server B, 95% probability (has passed last two deployments, failed one before)
Server C, 70% probability (has passed last deployment, failed two before)

In the exemplary calculation, deployment of server A is in progress, deployment of server B is also in progress and deployment of server C has been successfully completed. The probability of a particular server completing is calculated by multiplying the value for the state rating by the value of the weight rating of the server and by the deployment success probability for the server. This gives the probability of the deployment on the particular server being successful.

For server A, whose state is "started", the state rating value is 0.8, the weight rating, based on past history is 0.9 and the deployment success probability is 0.99 as it has passed the last three deployments. Multiplying 0.8 by 0.9 and by 0.99 gives 0.7128, which corresponds to a 71.28% chance of the deployment on server A being successful. Similarly for server B, the corresponding state rating, weight rating and deployment success probability are 0.8, 0.7 and 0.95, giving 0.532, which corresponds to a 53.2% chance of the deployment on server B being successful. As server C has successfully deployed, the probability is 1, which corresponds to a 100% chance of the deployment on server C being successful. The state rating, weight rating and deployment success probability given above are exemplary only and will vary for each server based on the past history of the server. Different initial values for these rating may also be chosen before a history is available for the server. The above are provided as examples only in order to assist in understanding embodiments of the invention.

The average value of the probability of the deployment on each of the particular servers being successful is then calculated to give a total flip forecast probability. Calculating the average for server A, server B and server C above gives (0.7128+0.532+1)/3, which is 0.7483, corresponding to a 74.83% chance of a flip occurring. As 0.7483 is less than 0.8, the threshold value, a decision can be made to proceed with testing on the active side as there is likely to be time to complete the test before the flip is complete. Different numbers of servers or different ways of combining together the probabilities may be used and the method described above is exemplary only. The threshold value may be 0.8 or it may be any other value, chosen based on experience of the value needed for a system to work optimally. The above are provided as examples only in order to assist in understanding embodiments of the invention.

A particular embodiment of the method shown in FIG. 7 is shown below in the form of pseudo-code implementing the forecasting algorithm method of FIG. 7.

```
server_list=['serverA','serverB',serverC']
smoke_tests=[ ]
flip_forecast=0
if get_is_deploying( )==True:
flip_forecast_array=[ ]
for server in server_list:
    # Value between 0 and 1 returned—Importance of 1
    server_current_state=getCurrentStateRating-
        (server)

# Value between 0 and 1 returned—Importance of 2
    server_weighting=getWeightingRating(server)
    # Value between 0 and 1 returned—Importance of 3
    server_success_probability=getSuccessProbability-
        Rating(server)
    server_flip_forecast=calculate_server_forecast
        (server_current_state,server_weighting,server_suc-
        cess_probability)
    flip_forecast_array.add(server_flip_forecast)
flip_forecast=calculate_forecast(flip_forecast_array)
if get_is_smoke_testing( )==True:
flip_forecase_array=[ ]
for smoke test in smoke_tests:
    # Value between 0 and 1 returned—Importance of 1
    current_smoke_test_results_state=getCurrent-
        SmokeTestRating(smoke_test)
    # Value between 0 and 1 returned—Importance of 2
    smoke_test_weighting=getSuccessProbability- Rat-
        ing(smoke_test)
    # Value between 0 and 1 returned—Importance of 3
    smoke_test_probability=getSmokeTestPass-Proba-
        bilityRating(smoke_test)
    smoke_test_forecast=calculate_smoke_test_forecast
        (current_smoke_test_results_state,    smoke_test_
        weighting, smoke_test_probability)
    flip_forecast_array.add(smoke_test_forecast)
    flip_forecast=calculate_forecast(flip_forecast_array)
else:
flip_forecast=0
#Flip Forecast
if flip_forecast <0.8:
print 'You can test'
else:
print 'Flip Pending, do not test'
```

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing two asynchronous workflows in a computer system having at least an active server and a passive server, a first asynchronous workflow being for deployment of a code upgrade on said passive server, a second asynchronous workflow being for testing on said active server, the method comprising:
   determining the operating state of the passive server, wherein the operating state of the passive server comprises one or more of a deploying state and a smoke testing state;
   determining the probability of the operating state successfully completing, wherein determining the probability of the deploying state successfully completing comprises:
      identifying a state rating associated with the current state of the passive server;
      identifying a weighted rating associated with the passive server;
      identifying a deployment success probability rating associated with the passive server; and
      determining the probability of the deploying state successfully completing based on the state rating, the weighted rating and the deployment success probability;
   based on the probability of the operating state successfully completing exceeding a predetermined value, performing the second asynchronous workflow after the operating state successfully completes.

2. The method of claim 1, wherein determining the probability of the smoke testing state successfully completing comprises:
   identifying a state rating associated with the current state of the smoke test;
   identifying a weighted rating associated with the smoke test;
   identifying a deployment success probability rating associated with the smoke test; and
   determining the probability of the smoke testing state successfully completing based on the state rating, the weighted rating and the deployment success probability.

3. The method of claim 2, wherein determining the probability of the smoke testing state successfully completing based on the state rating, the weighted rating and the deployment success probability comprises averaging the state rating, the weighted rating and the deployment success.

4. The method of claim 3, wherein delaying the second asynchronous workflow until the operating state successfully completes comprises determining if the probability of the operating state successfully completing is below a threshold value.

5. The method of claim 1, further comprising determining whether the passive server is in an available state and based on a determination that the passive server is in an available state executing the second asynchronous workflow.

6. The method of claim 1, further comprising determining whether the passive server is in a flipping state and based on a determination that the passive server is in a flipping state delaying the second asynchronous workflow.

7. A computer program product of managing two asynchronous workflows in a computer system having at least an active server and a passive server, a first asynchronous workflow being for deployment of a code upgrade on said passive server, a second asynchronous workflow being for testing on said active server, the computer program product comprising:
   one or more computer-readable storage devices and program instructions stored on at least one of the one or more tangible storage devices, the program instructions comprising:
   program instructions to determine the operating state of the passive server, wherein the operating state of the passive server comprises one or more of a deploying state and a smoke testing state;
   program instructions to determine the probability of the operating state successfully completing, wherein the program instructions to determine the probability of the deploying state successfully completing comprises:
      program instructions to identify a state rating associated with the current state of the passive server;
      program instructions to identify a weighted rating associated with the passive server;

program instructions to identify a deployment success probability rating associated with the passive server; and program instructions to determine the probability of the deploying state successfully completing based on the state rating, the weighted rating and the deployment success probability;

based on the probability of the operating state successfully completing exceeding a predetermined value, program instructions to perform the second asynchronous workflow after the operating state successfully completes.

8. The computer program product of claim 7, wherein determining the probability of the smoke testing state successfully completing comprises:

program instructions to identify a state rating associated with the current state of the smoke test;

program instructions to identify a weighted rating associated with the smoke test;

program instructions to identify a deployment success probability rating associated with the smoke test; and program instructions to determine the probability of the smoke testing state successfully completing based on the state rating, the weighted rating and the deployment success probability.

9. The computer program product of claim 8, wherein determining the probability of the smoke testing state successfully completing based on the state rating, the weighted rating and the deployment success probability comprises averaging the state rating, the weighted rating and the deployment success.

10. The computer program product of claim 9, wherein the program instructions to delay the second asynchronous workflow until the operating state successfully completes comprises program instructions to determine if the probability of the operating state successfully completing is below a threshold value.

11. The computer program product of claim 7, further comprising program instructions to determine whether the passive server is in an available state and based on a determination that the passive server is in an available state executing the second asynchronous workflow.

12. The computer program product of claim 7, further comprising program instructions to determine whether the passive server is in a flipping state and based on a determination that the passive server is in a flipping state delaying the second asynchronous workflow.

13. A computer system for of managing two asynchronous workflows in a computer system having at least an active server and a passive server, a first asynchronous workflow being for deployment of a code upgrade on said passive server, a second asynchronous workflow being for testing on said active server, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine the operating state of the passive server, wherein the operating state of the passive server comprises one or more of a deploying state and a smoke testing state;

program instructions to determine the probability of the operating state successfully completing, wherein the program instructions to determine the probability of the deploying state successfully completing comprises:

program instructions to identify a state rating associated with the current state of the passive server;

program instructions to identify a weighted rating associated with the passive server;

program instructions to identify a deployment success probability rating associated with the passive server; and program instructions to determine the probability of the deploying state successfully completing based on the state rating, the weighted rating and the deployment success probability;

based on the probability of the operating state successfully completing exceeding a predetermined value, program instructions to perform the second asynchronous workflow after the operating state successfully completes.

14. The computer system of claim 13, wherein determining the probability of the smoke testing state successfully completing comprises:

program instructions to identify a state rating associated with the current state of the smoke test;

program instructions to identify a weighted rating associated with the smoke test;

program instructions to identify a deployment success probability rating associated with the smoke test; and program instructions to determine the probability of the smoke testing state successfully completing based on the state rating, the weighted rating and the deployment success probability.

15. The computer system of claim 14, wherein determining the probability of the smoke testing state successfully completing based on the state rating, the weighted rating and the deployment success probability comprises averaging the state rating, the weighted rating and the deployment success.

16. The computer system of claim 13, further comprising program instructions to determine whether the passive server is in an available state and based on a determination that the passive server is in an available state executing the second asynchronous workflow.

17. The computer system of claim 13, further comprising program instructions to determine whether the passive server is in a flipping state and based on a determination that the passive server is in a flipping state delaying the second asynchronous workflow.

* * * * *